(12) United States Patent
Anderson et al.

(10) Patent No.: US 8,706,969 B2
(45) Date of Patent: Apr. 22, 2014

(54) VARIABLE LINE SIZE PREFETCHER FOR MULTIPLE MEMORY REQUESTORS

(75) Inventors: Timothy D Anderson, Dallas, TX (US); Kai Chirca, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 178 days.

(21) Appl. No.: 13/218,394

(22) Filed: Aug. 25, 2011

(65) Prior Publication Data

US 2012/0072667 A1  Mar. 22, 2012

Related U.S. Application Data

(60) Provisional application No. 61/387,367, filed on Sep. 28, 2010, provisional application No. 61/384,932, filed on Sep. 21, 2010.

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl.
USPC .......................................... 711/122; 711/213

(58) Field of Classification Search
USPC .................................................. 711/122, 213
See application file for complete search history.

(56) References Cited

U.S. PATENT DOCUMENTS

| | | | | |
|---|---|---|---|---|
| 5,761,706 | A * | 6/1998 | Kessler et al. | 711/118 |
| 7,000,097 | B2 * | 2/2006 | Senter et al. | 712/245 |
| 2010/0030973 | A1 * | 2/2010 | Speight et al. | 711/137 |

* cited by examiner

*Primary Examiner* — Matthew Bradley
*Assistant Examiner* — Rocio Del Mar Perez-Velez
(74) *Attorney, Agent, or Firm* — Robert D. Marshall, Jr.; W. James Brady; Frederick J. Telecky, Jr.

(57) ABSTRACT

A prefetch unit generates prefetch addresses in response to an initial received memory read request, an address associated with the initial received memory read request, a line length of the requestor of the initial received memory read request, and a request type width of the initial received memory read request. Prefetch operations are generated using the generated prefetch addresses, wherein each generated prefetch address is stored in a prefetch buffer slot that is selected by a prefetch FIFO (First In First Out) prefetch counter. Subsequent hits on the prefetcher result in returning prefetched data to the requestor in response to a subsequent memory read request received after the initial received memory read request.

5 Claims, 6 Drawing Sheets

VARIABLE LINE SIZE PREFETCHER FOR MULTIPLE MEMORY REQUESTORS

CLAIM OF PRIORITY

This application for Patent claims priority to U.S. Provisional Application No. 61/387,367 entitled "Combined integer to floating point conversions with varied precision formats" filed Sep. 28, 2010, and claims priority to U.S. Provisional Application No. 61/384,932 entitled "Prefetch Stream Filter with FIFO Allocation and Stream Direction Prediction" filed Sep. 21, 2010, wherein the applications listed above are incorporated by reference herein.

BACKGROUND

In computer architecture applications, processors often use caches and other memory local to the processor to access data during execution. The processors more efficiently execute instructions when, for example, data accessed by a processor is stored locally in a cache. Prefetchers are used to predictively access and store data in view of potential requests for data and/or program data stored in the memory. A prefetcher stores blocks of memory locally in a smaller, lower latency memory buffer using a replacement policy that governs which data are to be discarded when new data arrives. If the discarded data have been requested by the cache system but have not yet been sent to processor requesting the data, then new prefetches that are allocated to those locations are forced to stall (e.g., wait) until the data is returned to the cache to maintain cache coherency. The problem is compounded when multiple caches (often having differing line sizes and timing requirements) are used. Thus, an improvement in techniques for reducing stalls associated with generation of prefetch requests for a cache is desirable.

The problems noted above are solved in large part by a prefetch unit that minimizes latency of memory in a system having multiple layers of memory. The disclosed prefetch unit can service multiple memory requestors (such as a processor, and memory controllers of level-one (L1) and level-two (L2) caches, even when the caches have different line sizes. Accordingly, the disclosed prefetch unit can prefetch memory from a grater range of memory, which provides a higher level of performance (such as reduced latencies and reduced space and power requirements).

As disclosed herein, a prefetch unit generates prefetch addresses in response to an initial received memory read request, an address associated with the initial received memory read request, a line length of the requestor of the initial received memory read request, and a request type width of the initial received memory read request. Prefetch operations are generated using the generated prefetch addresses, wherein each generated prefetch address is stored in a prefetch buffer slot that is selected by a prefetch FIFO (First In First Out) prefetch counter. Subsequent hits on the prefetcher result in returning prefetched data to the requestor in response to a subsequent memory read request received after the initial received memory read request.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
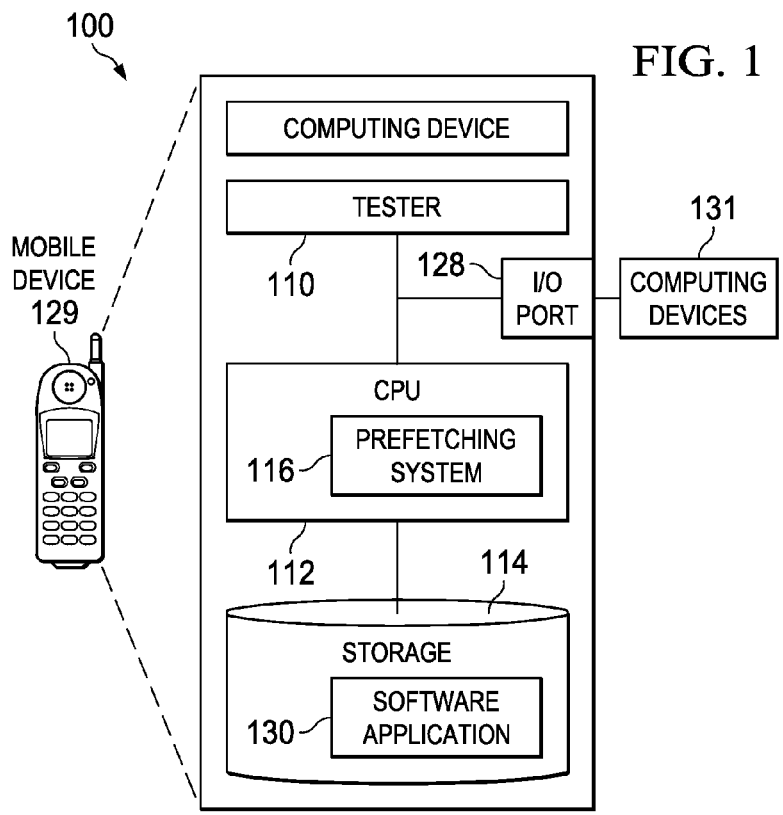
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 131. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or prefetching systems 116, which are used to perform memory prefetch operations during the execution of the software application 130.

Prefetching systems 116 track memory requests from one or more streams using "slots" to maintain pointers to memory addresses used to prefetch data for each stream. Conventional prefetching systems stall prefetch generation for a slot until all the data stored in the slot is sent to the cache. However, delaying prefetches reduces the amount of latency a prefetch unit is able to provide, which adversely affects hurts performance. Increasing the number of slots and associated hardware of the prefetch unit helps to reduce the number of times prefetch generation is stalled. However, this approach involves larger area and power costs due to extra the hardware and added address comparators for hit checks for all of the slots.

Disclosed herein are techniques for reducing hardware latency associated with prefetch buffer memory accesses. The disclosed techniques reduce hardware latency by arranging a prefetch unit to service caches of differing function and sizes. For example, variable line size prefetching is performed for various caches such as a level-one data (L1D) cache and/or a level-one program cache (UP) and a level-two (L2) cache, wherein the caches from different levels (and/or caches from the same level) have differing operating parameters such as line sizes and/or request type width (such as 32-bit word or a 64-bit word widths).

Figure 2:
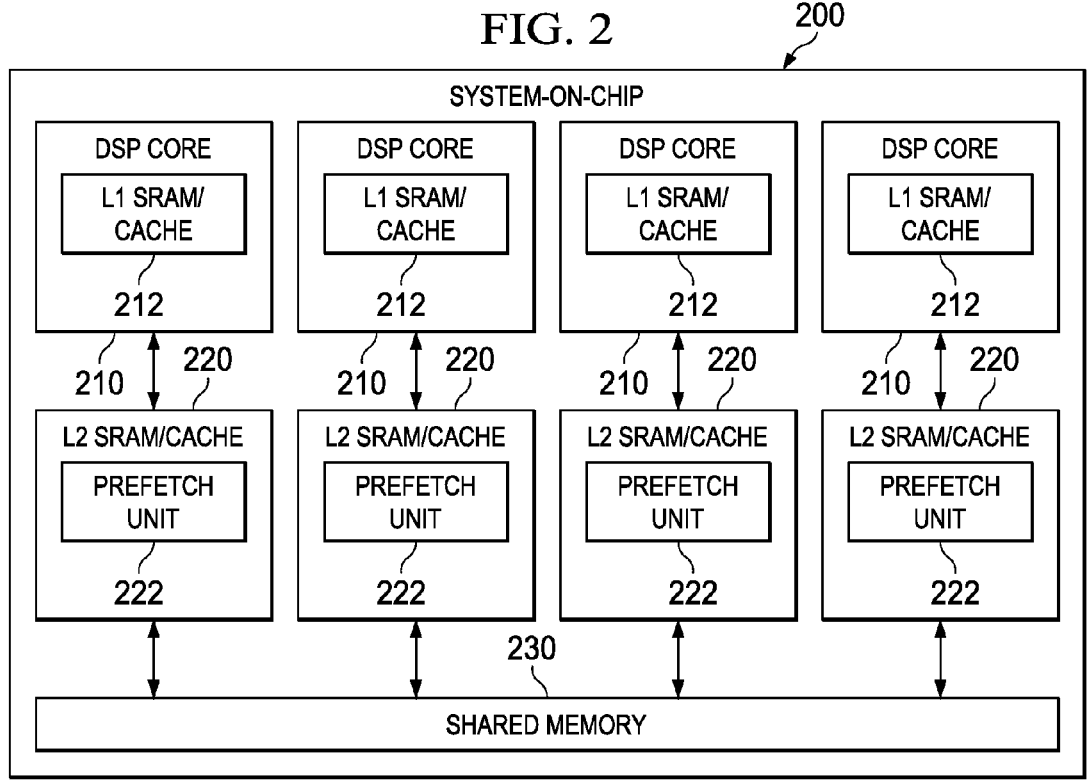
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as an SoC 200 that includes one or more DSP cores 210, SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a level-one data cache such as SRAM/Cache 212. Each DSP core 210 optionally is connected to a level-two cache such as SRAM/Cache 220. Each SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than SRAM/Cache 212 or SRAM/Cache 220. The shared memory 230 stores program and data information that can be shared between each DSP core 210.

In various embodiments, the prefetch unit 222 is a program prefetcher that allocates an available slot to a program accesses and provides a dynamically sized buffer for storing information in slots and/or half slots to accommodate differing line sizes and request types from differing streams.

Figure 3:
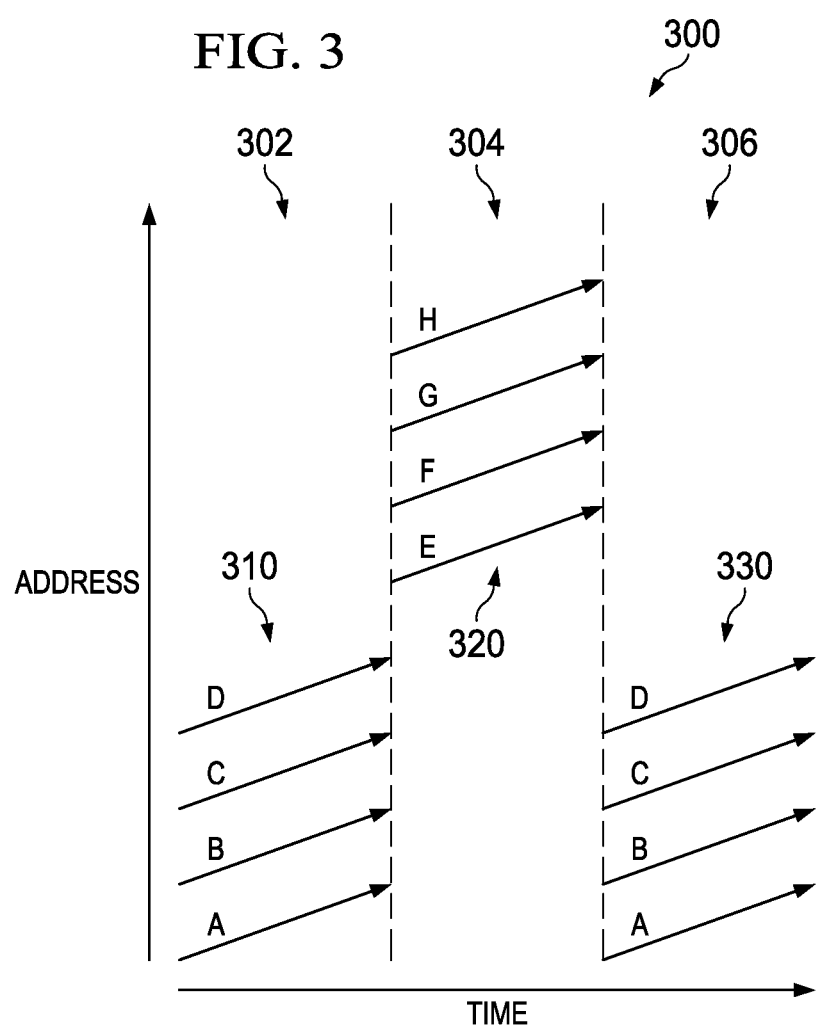
FIG. 3 is a timing diagram illustrating multi-stream memory accesses over time.

FIG. 3 is a timing diagram illustrating multi-stream memory accesses over time. Plot 300 vertically represents increasing memory addresses and horizontally represents memory accesses of data over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++)\{d[i]=a[i]+b[i]+c[i]\} \tag{1}$$

performs memory accesses that, when plotted, produces traces (designated generally) 310. Each reference to an element of arrays "a," "b," "c,' and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

Figure 4:
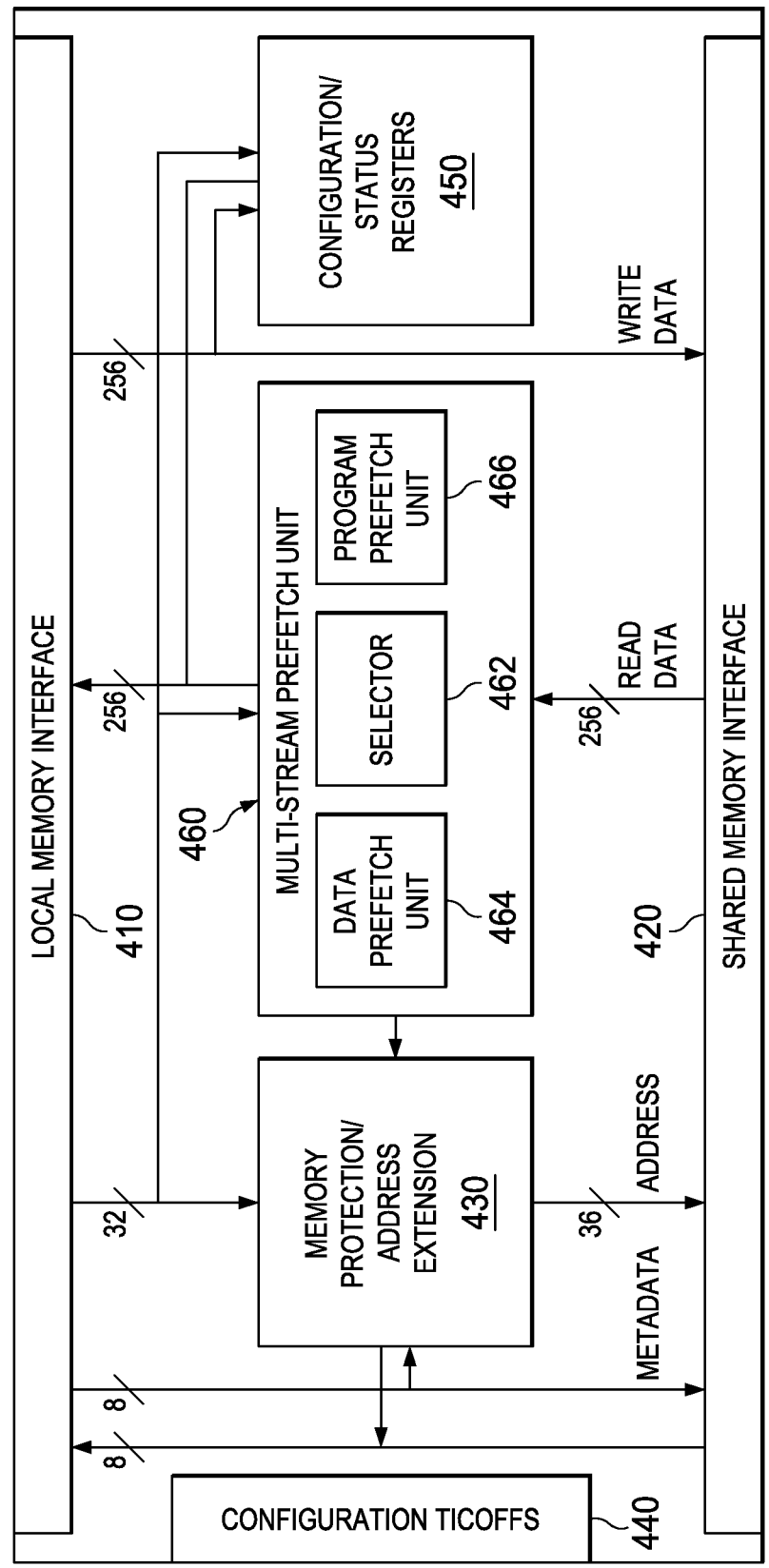
FIG. 4 is a block diagram illustrating a memory controller that includes a multi-stream prefetch unit in accordance with embodiments of the present disclosure.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory controller such as L2 SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction (e.g., program data) fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, request for access type (data, instruction or prefetch), and request priority and elevated priority.

Memory controller 400 includes unit for memory protection/address extension 430. The unit for memory protection/ address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 includes a selector 462 that chooses a prefetch unit based upon the type of memory request that is received. When, for example, a request from a level-one data cache is received, the selector 462 enables data prefetch unit 464 to handle potential prefetches for the received data memory request. Likewise, when a request from a level-one program cache is received, the selector 462 enables program prefetch unit 466 to handle potential prefetches for the received program memory request. The data prefetch unit 464 is discussed below with respect to FIG. 5 and the program prefetch unit 466 is discussed below with respect to FIG. 6.

Figure 5:
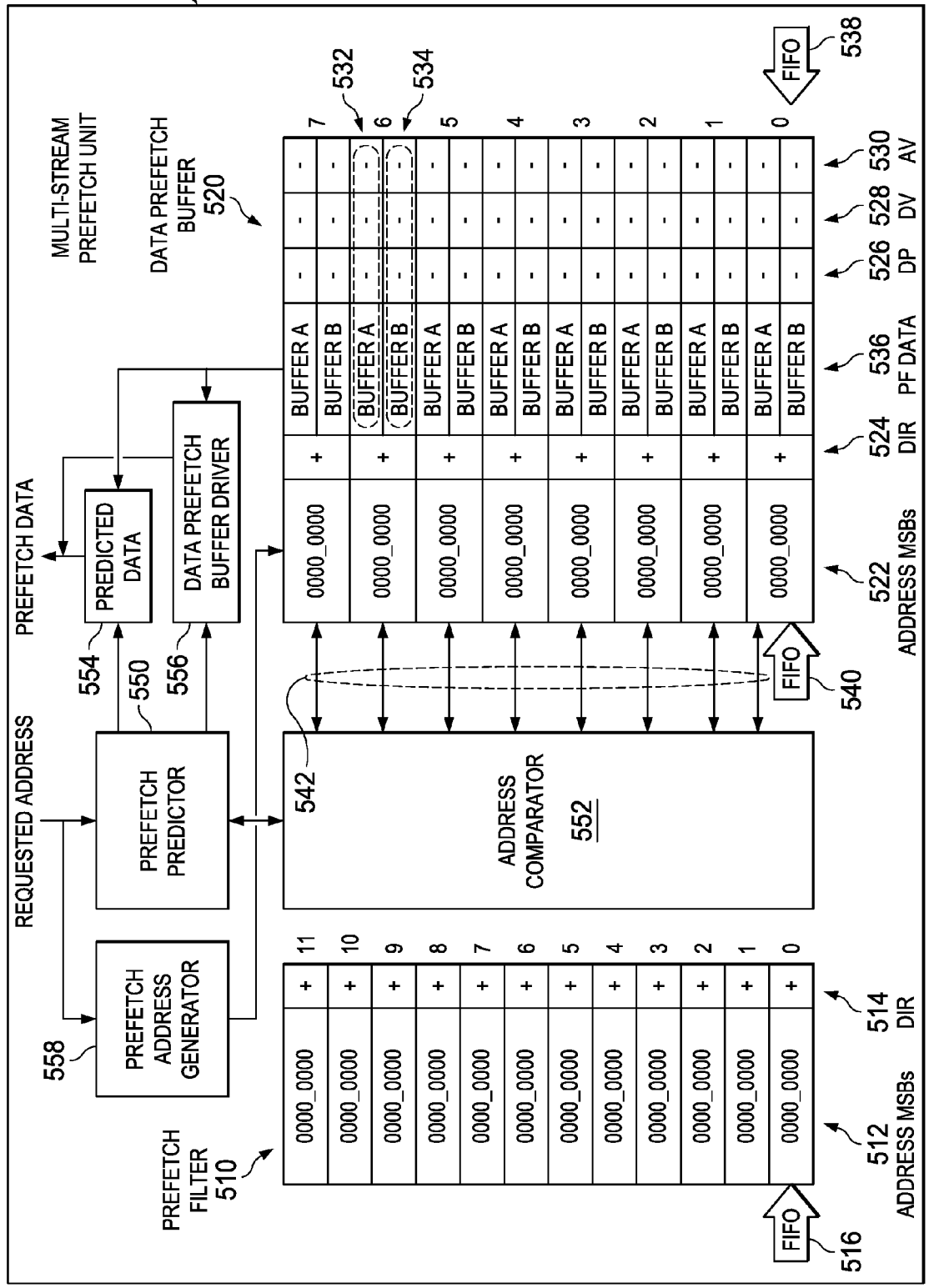
FIG. 5 is a block diagram illustrating a data prefetch unit in accordance with embodiments of the present disclosure.

FIG. 5 is a block diagram illustrating a data prefetch unit in accordance with embodiments of the present disclosure. Data prefetch unit 464 typically includes a prefetch filter 510 (which is used for identification of streams), a data prefetch buffer 520 (which is used to prefetch data for streams having assigned slots), and a prefetch predictor 550 (for predicting and controlling output buffers of the data prefetch buffer).

Identification of streams is a difficult problem as modern DSP (digital signal processor) code often contains data streams that progress in both incrementing (upward) and decrementing (downward) directions. Memory accesses also include many non-streaming accesses (which often have the appearance of random accesses as viewed in a memory access footprint plot, and are thus referred to as "random accesses" herein) that are not part of a predictable access pattern such as streams. Attempting to prefetch cache lines based on every memory request would result in a lot of unusable speculative traffic, which greatly amplifies memory bandwidth requirements and negatively impacts performance. The disclosed prefetch filter 510 works to filter out these random (non-streaming and/or non-prefetchable) accesses so that only predictable streams are used by the data prefetch buffer 520 to prefetch.

Prefetch filter 510 is also arranged to correctly predict direction as well as the location of streams. Stream detectors typically hold addresses for potentially identifying streams while waiting for a cache read to "hit" an address associated with one of the potential streams. Thus, address prediction, direction prediction, and replacement policies for the stream detector affect the performance of the data prefetch unit 464.

Prefetch filter 510 uses an aligned power-of-two address window, which is used to detect sequential accesses and to determine a direction of a stream. (As discussed below, the disclosed prefetch filter 510 in most cases only takes two sequential accesses to detect a stream, and otherwise, when the direction estimate is wrong, it would only take a third access to verify the direction of a stream to be identified.)

The direction estimate heuristic and FIFO-based allocation architecture minimizes power and area requirements due to their implementation efficiency while maintaining a high level of performance when executing DSP algorithms for emerging applications. Not requiring an adder to generate a sequential address for the address prediction function minimizes latency and thus improves the operating frequency of a filter implemented by a DSP that incorporates a data prefetch unit 464.

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various counting systems, such as Gray code, can be used). Each new allocation of a candidate stream in the prefetch filter 510 uses the next slot number indicated by the FIFO counter 516. Allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared (or main) memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g., decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-one data cache) access, whether the memory access is a non-critical half of an L2 line (level-two cache) line access, and whether the memory access is not already present in the data prefetch buffer 520.

The memory accesses meeting the preceding qualifications are then compared against the existing entries of potential streams in the various slots of the prefetch filter 510. L1D requests are compared at 64 byte granularity, whereas L2 requests are compared at 128 byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
|---|---|---|---|
| L1D | Bit 6 = 0 | Requested address + 64 | Increasing address |
| L1D | Bit 6 = 1 | Requested address − 64 | Decreasing address |
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128 byte (L1D stream) or 256 byte (L2 stream) boundary. Thus, the first two fetches for each L1D stream (being half the size of L2 streams) normally correspond to the two half-slots of a single slot.

Data prefetch unit 464 includes the data prefetch buffer 520, which is used to prefetch data for streams having assigned slots. In an embodiment, the data prefetch unit 464 is a relatively simple prefetch engine for servicing direct L1D (level-one data) cache requests and L2 data fetches. The data prefetch unit 464 uses an extended memory prefetch scheme, extended to the full address space in shared memory. The data prefetch unit 464 handles cacheable, prefetchable data fetches as candidates for prefetching.

The data prefetch unit 464 holds eight logical slots, each of which is associated with storage for two 64-byte data fetches such as buffer A and B of PF (prefetch) data 536. Double buffering the data for each slot in PF data 536 allows for a prefetch to be started on a subsequent prefetch (for example) using buffer B before a memory request is made for the data in buffer A of the slot (e.g., a return-wait situation). The data prefetch unit 464 can reallocate a slot immediately if at least one of its two halves (e.g., buffer A or buffer B of PF data 536) is not busy and the slot is not in a hit-wait state (e.g., waiting for data associated with a data prefetch unit 464 hit to be read-out). The double-buffer approach allows new prefetch generation to proceed immediately in case a prefetch hit results in a return-wait situation (where, for example, for a prefetch to be started on a subsequent prefetch (for example) using buffer B before a memory request is made for the data in buffer A of the slot). Double buffering each slot of the data prefetch unit 464 speeds prefetching because the data prefetch unit 464 will normally need to reallocate the slot that the most recent demand fetch just hit, and the time of allocation when the local memory will read the data for the hit is not ascertainable beforehand. Thus the double-buffer approach allows the prefetch generation to proceed even before data prefetch unit 464 sends the hit data to the upstream local memory (e.g., SRAM/Cache 220).

Also, the data prefetch buffer 520 avoids reallocating a slot in the hit-wait state in case the prefetch associated with the slot is canceled. When the prefetch is canceled, the data prefetch unit 464 uses the address stored in the slot to regenerate the demand fetch. For example, a new prefetch too early by the data prefetch unit 464 may force the stream prefetch unit 460 (belonging to a neighboring slave, for example) to cancel the earlier prefetch.

Each of the eight slots has at least one address field 522, a direction field (DIR) 524, a data pending (DP) field 526, a data valid (DV) field 528, an address valid (AV) field 530, and a predicted next prefetch half-slot (PHP) field 536. Address field 522 stores upper bits of a logical address associated with the associated slot. The logical address is generated by a data prefetch address generator 558 that is arranged to generate data prefetch addresses in response to received addresses that are associated with memory requests. Data pending (DP) field 526 is used to indicate whether a prefetch is outstanding in the associated slot. Data valid (DV) field 528 is used to indicate whether the program data in the associated slot is valid. The data prefetch unit 464 does not necessarily keep a separate "address valid" bit for each stream. Instead, the data prefetch unit 464 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each half-slot. Thus (for example), group 532 includes a data pending (DP) field 526, a data valid (DV) field 528, and an address valid (AV) field 530 for a first half slot of a slot, and group 534 includes a data pending (DP) field 526, a data valid (DV) field 528, an address valid (AV) field 530 for a second half-slot of the slot.

The data prefetch unit 464 allocates slots using a FIFO allocation ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

In the case of a typical prefetch hit (determined by prefetch address comparators 552, for example) that occurs in response to a memory request, the data prefetch unit 464 queues the prefetch data for return. If the data prefetch unit 464 queues has no other return data queued, the data prefetch unit 464 can begin returning data in response to the memory request.

In the event where the prefetch predictor 550 has not successfully predicted the memory request in the event of a hit in the data prefetch buffer 520, the data can be retrieved from data prefetch buffer in two clock cycles. During the first clock cycle prefetch address comparators 552 drives an enable line (e.g., in bus 542) to select a slot that is associated with the address of the memory request and to set-up a selected portion (e.g., upper-half and/or lower-half) of the slot for a memory read. During the second clock cycle, data is read from buffer A and/or B of prefetch (PF) data 536 for the selected slot. Data prefetch buffer driver 556 is enabled to drive a data portion of a bus so that the requested data can be retrieved in response to the memory request.

Thus, the prefetch buffer would ordinarily take two full clock cycles to reply to a prefetch hit: to potentially reduce the latency of two clock cycles, the prefetch predictor 550 anticipates which slot or half-slot would likely be hit next and provisions the data for readout in one clock cycle. In an embodiment, the prefetch predictor 550 asserts the anticipated read-out address ahead of time (e.g., before a next memory request is received) to minimize (for example) the time required to retrieve the data from the associated half-slot. In another embodiment the data from the anticipated half-slot is copied to predicted data buffer 554 (which has a select signal asserted in response to the address anticipated by the prefetch predictor 550) to provision (e.g. set-up) the predicted data buffer 554 to be read before a memory request is received that has an address associated with the slot from which the data from the predicted data buffer 554 was obtained. Thus, when a new memory request arrives that matches the previously asserted address, the prefetch buffer can respond with data in the following clock cycle, and thus respond within a zero wait-state response time.

The prefetch predictor 550 heuristically determines the predicted next prefetch (PNP) by anticipating that the next prefetch hit will be for the slot "after" the slot for the current hit in the prefetch buffer. The slot "after" the currently hit slot is the next slot that follows the currently hit slot in accordance with the direction of the stream that is associated with the currently hit slot. The probabilities for correctly predicting the next prefetch are increased (over random estimates, for example) because (as disclosed herein) prefetch slots are allocated in a FIFO allocation order, and thus prefetch hits are more likely to occur in the order used for FIFO allocation (e.g., the FIFO allocation order). The prefetch predictor 550 uses FIFO counter 538 to point to the predicted next prefetch.

In addition to selecting a slot, an upper-half or lower-half of the slot is predicted. The prefetch predictor 550 determines an upper- or lower-half for the predicted next prefetch by selecting the lower-half of the (next) slot when the stream associated with that slot is moving in the increasing-address direction, and or the upper-half otherwise. In the case where L2 (cache level two) line fills are accomplished by reading half-slots (such as occurs when prefetching data), L2 line fills are optimized (e.g., with zero wait state response) when the requested half-line from L2 correlates properly with the direction of the stream associated with the predicted half-slot.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "un-stalls" and resumes execution when the critical sub-line is fetched from the cache.

Figure 6:
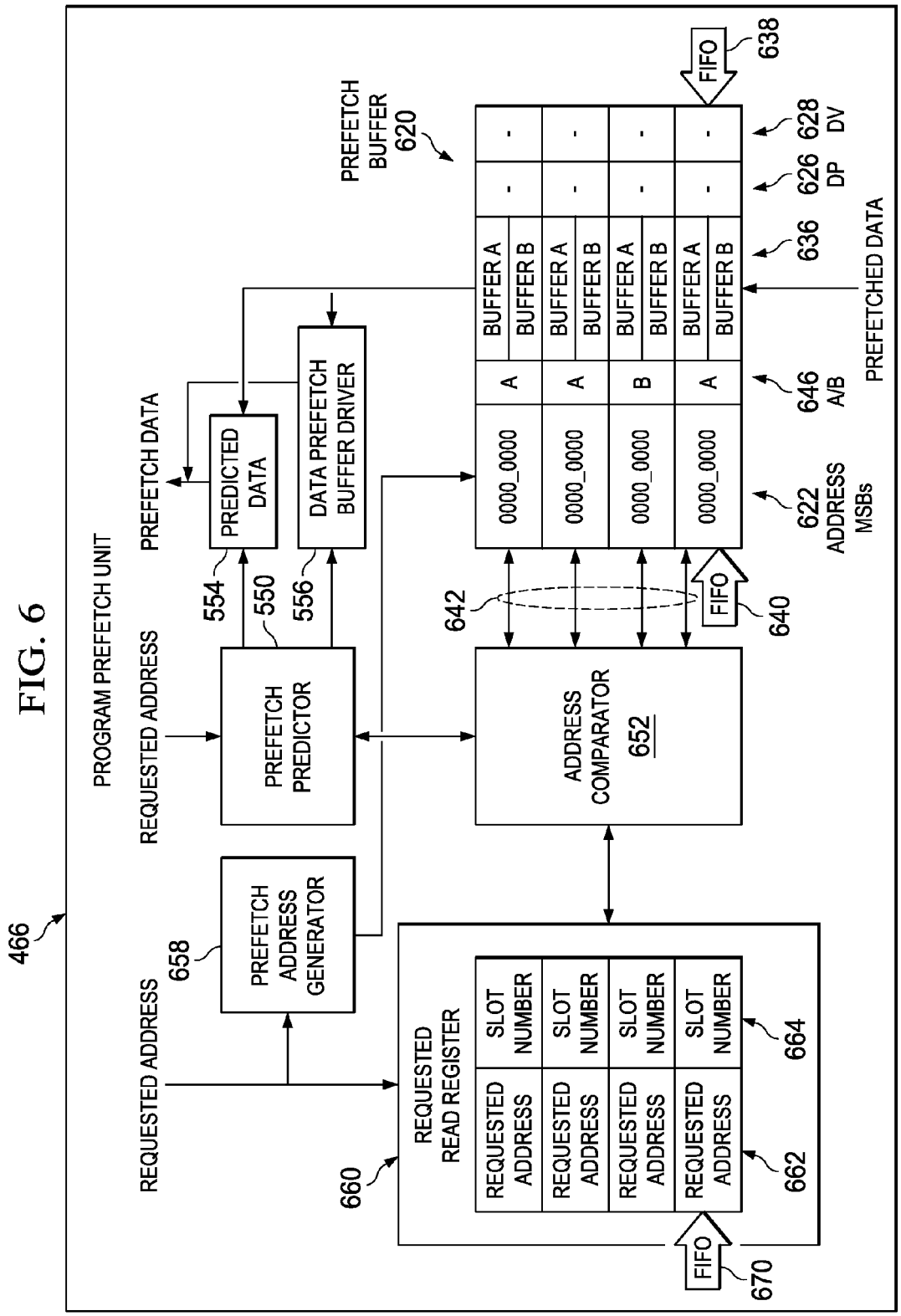
FIG. 6 is a block diagram illustrating a program prefetch unit in accordance with embodiments of the present disclosure.

FIG. 6 is a block diagram illustrating a program prefetch unit 466 in accordance with embodiments of the present disclosure. Program prefetch unit 466 typically includes a program prefetch buffer 620 (for prefetching program data for a program stream) and a requested read register predictor 660 (for maintaining read requests and controlling reads of the double buffers of the program prefetch buffer). Although a program prefetch unit 466 is described in an embodiment as being a prefetch buffer for program accesses, the program prefetch unit 466 can also be used in the context of fetching data for multiple streams.

Program prefetch unit 466 includes the program prefetch buffer 620, which is used to prefetch program data for a program stream. In an embodiment, the program prefetch buffer 620 is a relatively simple prefetch engine for servicing direct L1P (level-one program) cache requests and L2 program fetches. The program prefetch buffer 620 uses an extended memory prefetch scheme, extended to the full address space in shared memory. The program prefetch buffer 620 handles cacheable, prefetchable program fetches as candidates for prefetching.

The program prefetch buffer 620 as illustrated holds four logical slots, each of which is associated with storage for two 32-byte program fetches, stored in buffer A and B of PF (prefetch) data 636. Double buffering the data for each slot in PF data 636 allows for a prefetch to be started on a subsequent prefetch using buffer B (for example) before a memory request is made (or completed) for the data in buffer A of the slot (e.g., a return-wait state). The program prefetch buffer 620 can reallocate a slot immediately if at least one of its two halves (e.g., buffer A or buffer B of PF data 636) is not busy and the slot is not in a hit-wait state (e.g., waiting for data associated with a program prefetch buffer 620 hit to be read-out).

Field A/B 646 is a data buffer selector used to determine which buffer (Buffer A or Buffer B) is used to hold data that is in a return-wait state (and conversely, which buffer is used to hold data returned from a new prefetch generation). Field A/B 646 is toggled to avoid overwriting stored data when a return-wait state is encountered. Toggling field A/B 646 allows, for example, the data stored as a result of the new prefetch generation to be returned (e.g., read-out) to the requesting processor or cache without having to transfer the data to the "other" buffer, which minimizes latency. (Likewise, a data buffer selector similar to field A/B 646 can be used to implement double buffering of the data prefetch unit 464, described above with reference to FIG. 5.)

The double-buffer approach allows new prefetch generation to proceed immediately when a prefetch hit results in a return-wait situation. Double buffering each slot of the program prefetch unit 466 speeds prefetching because the program prefetch buffer 620 normally reallocates the slot associated with the demand fetch that most recently hits. Double buffering each slot of the program prefetch buffer 620 also speeds prefetching when the time of allocation (when the local memory will read the data for the hit) is not ascertainable beforehand. Thus, the double-buffer approach allows the prefetch generation to proceed even before program prefetch buffer 620 sends the hit data to the upstream local memory (e.g., L1 SRAM/Cache 212 or L2 SRAM/Cache 220).

Also, the program prefetch buffer 620 avoids reallocating a slot in the hit-wait state in case the prefetch associated with the slot is canceled. When the prefetch is canceled, the program prefetch buffer 620 uses the address stored in the slot to regenerate the demand fetch. For example, a new prefetch generated too early by the program prefetch buffer 620 may force another multi-stream prefetch unit 460 (belonging to a neighboring slave, for example) to cancel the earlier prefetch.

Each of the slots of the program prefetch buffer 620 has at least one address field 622, a data pending (DP) field 626, a data valid (DV) field 628, a double buffer 636 that contains a Buffer A and a Buffer B, and the A/B field as described above. Address field 622 typically stores (at least) the upper bits of a logical address associated with the associated slot. Data pending (DP) field 626 is used to indicate whether a prefetch is outstanding the associated slot. Data valid (DV) field 628 is used to indicate whether the program data in the associated slot is valid. The program prefetch buffer 620 does not necessarily keep a separate "address valid" bit for each slot. Instead, the program prefetch buffer 620 launches prefetch requests for any slot that has data pending or data valid bit that is set to be valid. Thus, a demand fetch would normally only "hit" slots for which DP field 626 is pending or DV field 628 is valid.

The program prefetch buffer 620 allocates slots using a FIFO allocation ordering system. For example, a first slot is allocated first (by using FIFO counter 640 to point the first slot), followed by the second slot, the third slot, and so on until the last slot (such as the fourth slot) before wrapping back to the first slot. Each slot is associated with two 32-byte data buffers that are structured respectively as a first and second portion of a double-buffer. Metadata returned with a fetch (such as returned memory access permissions) can be stored in additional or otherwise unused bits of the first and/or second portions of the double buffer.

In the case of a typical prefetch hit (determined by prefetch address comparators 652, for example) that occurs in response to a memory request, the program prefetch buffer 620 queues the prefetch program data for return to the requesting processor or cache. If the program prefetch buffer 620 queues has no other return data queued, the program prefetch buffer 620 can begin returning data in response to the memory request.

Program prefetch address generator 658 generates program prefetch addresses in response to received addresses that are associated with memory requests. When a candidate program fetch misses the program prefetch buffer, addresses are generated for fetching the next 128 bytes following the last demand fetch address that missed the buffer. When a program fetch hits the program prefetch buffer, addresses are generated for the next 32, 64, 96, or 128 bytes, depending on whether the fetch hit the oldest (e.g., first stored with respect to the data stored in the other slots), second oldest, second youngest or youngest slot (respectively) in the buffer. Thus, the program prefetch address generator 658 keeps the prefetch buffer 128 bytes ahead of the current program stream, and provides the addresses to quickly switch streams when the program branches to a new location.

Because of bus width limitations, the length of the memory lines associated with slots are often wider than the bus width used to retrieve data for filling the lines. Thus memory lines are typically requested (for example) on a half-line or sub-line basis where the data to be cached is sent from a lower-level memory to the higher-level cache as a series of data bursts to retrieve the entire line. The program data for storing in the allocated cache line are sent such that the requested portion (e.g., the data that is addressed by the demand memory request) of the line returns first (the "critical" sub-line), which is then followed by the subsequent ("non-critical") sub-lines. A CPU (for example) that generated the demand request then "un-stalls" and resumes execution when the critical sub-line is fetched from the cache.

When a memory request for program instructions misses the prefetch buffer, the prefetch program prefetch address generator 658 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot. When a prefetch hit occurs due to an L1P (level-one program) request, the predicted next prefetch slot is set to one slot after the slot just hit in accordance with the FIFO slot allocation order. The prefetch unit 466 determines the criticality of the sub-line being fetched and the origin of the memory request by evaluating the metadata signals discussed above with respect to FIG. 4.

Requested read register 660 receives a memory request having an address for reading data (including program instruction data) stored in memory. Requested read register 660 stores the requested address in the requested address (Req. Addr.) field 662. The requested address is evaluated (using bus 642, for example) by address comparator 652 to determine whether the requested address "hits" the program prefetch buffer 620. If a hit occurs, the address comparator 652 passes to the requested read register 660 the slot number of the slot "hit" by the requested address. The hit slot number for the received memory request is stored in the Slot # field 664.

Requested read register 660 is organized as a FIFO such that received memory requests are handled using a First In, First Out policy. FIFO counter 670 is cycled such that each request (e.g., row) is handled in the order received, and that the each of the four slots is handled (e.g., the data associated with a slot is returned) before the FIFO counter 670 is recycled back to the first slot.

The program prefetch unit 466 heuristically determines the predicted next prefetch (PNP) by anticipating that the next prefetch hit will be for the slot "after" the slot for the current hit in the prefetch buffer. The slot "after" the currently hit slot is the next slot that follows the currently hit slot in accordance with the direction of the stream that is associated with the currently hit slot. The probabilities for correctly predicting the next prefetch are increased (over random estimates, for example) because (as disclosed herein) prefetch slots are allocated in a FIFO allocation order, and thus prefetch hits are more likely to occur in the order used for FIFO allocation (e.g., the FIFO allocation order). The program prefetch unit 466 uses FIFO counter 638 to point to the predicted next prefetch.

In the case of a typical prefetch hit (determined by prefetch address comparators 652, for example) that occurs in response to a memory request, the multi-stream prefetch unit 460 queues the prefetch data for return. If the multi-stream prefetch unit 460 queues has no other return data queued, the multi-stream prefetch unit 460 can begin returning data in response to the memory request.

In the event where the program prefetch unit 466 has not successfully predicted the memory request in the event of a hit in the data prefetch buffer 620, the data can be retrieved from data prefetch buffer in two clock cycles. During the first clock cycle prefetch address comparators 652 drives an enable line (e.g., in bus 642) to select a slot that is associated with the address of the memory request and to set-up a selected portion (e.g., upper-half and/or lower-half) of the slot for a memory read. During the second clock cycle, data is read from buffer A and/or B of prefetch (PF) data 636 for the selected slot. A prefetch buffer driver is enabled to drive a data portion of a bus so that the requested data can be returned to the requestor in response to the memory request.

Thus, the prefetch buffer would ordinarily take two full clock cycles to reply to a prefetch hit: to potentially reduce the latency of two clock cycles, anticipating which slot (and which "side" of the double buffer of the slot) would likely be hit next and provisions the data for readout in one clock cycle. In an embodiment, the anticipated slot number and the read out half of the double buffer are enabled ahead of time (e.g., before a next memory request is processed) to minimize (for example) the time required to retrieve the data from the associated half-slot. Thus, when a new memory request arrives that matches the previously asserted address, the prefetch buffer can respond with data in the following clock cycle, and thus respond within a zero wait-state response time.

When a memory request for program instructions misses the program prefetch unit 466, the program prefetch unit 466 sets the predicted next prefetch slot to the first allocated slot. When a prefetch hit of a critical sub-line occurs due to an L2 request for program prefetching, no action is taken because no new prefetches typically result. When a prefetch hit of a non-critical sub-line occurs due to an L2 request (which typically triggers new prefetches), the predicted next prefetch slot is set to the first allocated slot.

When a prefetch hit occurs due to an UP (level-one program) request, the predicted next prefetch slot is set to one slot after (e.g., in the order determined by the stream associated with the hit slot) the slot just hit in accordance with the FIFO slot allocation order. The program prefetch unit 466 determines the criticality of the sub-line being fetched and the origin of the memory request by evaluating the metadata signals discussed above with respect to FIG. 4.

Figure 7:
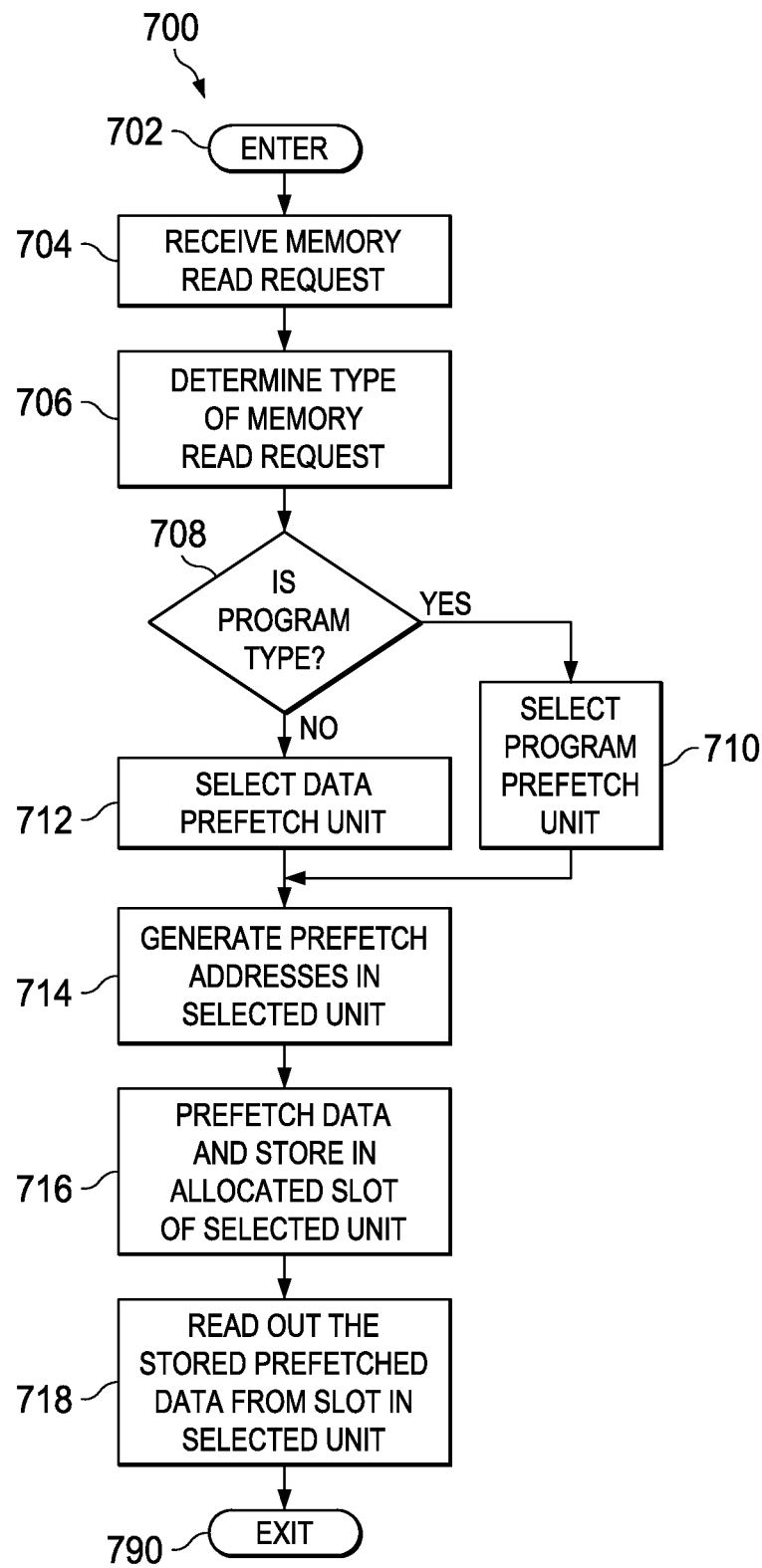
FIG. 7 is a process diagram illustrating a variable line size prefetching in accordance with embodiments of the present disclosure.

FIG. 7 is a process diagram illustrating a variable line size prefetching in accordance with embodiments of the present disclosure. Process 700 is entered at node 702 and proceeds to function 704. At function 704, a memory read request is received that includes an associated address for retrieving from memory.

At function 706, the type of memory read request is determined. In function 708, if the type of the received memory read request is a program type request, the process flow continues to function 710, or if not, the process flow continues to function 712.

In function 710, the program prefetch unit is selected for the received memory request and the received memory request is passed to the selected (e.g., program) prefetch unit. Process flow continues at function 714.

In function 712, the data prefetch unit is selected for the received memory request and the received memory request is passed to the selected (e.g., data) prefetch unit. Process flow continues at function 714.

In function 714, the selected prefetch unit generates prefetch addresses when, for example, no prefetch addresses have been generated for an address that is associated with the received memory request. The selected prefetch unit generates prefetch addresses using policies that are different from the unselected prefetch unit. For example, a level-one program cache may have a line size of 32 bytes and a request width of 32 bytes, whereas a level-one data cache may have a line size of 64 bytes and a request width of 64 bytes. Thus, the selected prefetch generator adjusts the number and size of the prefetch addresses in accordance with the stream type (e.g., program or data) and the line size and request width of a particular cache (e.g. a program or data cache at a level one or program-type or data-type stored in a unified level-two cache).

In function 716, the selected prefetch unit generates prefetch operations using the generated prefetch addresses and stores the prefetched data in slots of the selected unit.

In function 718, a subsequent memory request is received and the selected prefetch buffer determines whether the address that is associated with the subsequent received memory request is present (or "hit") in a slot of an array for storing an indication of the address of a prior cache request, and returns the data ("reads out") to the requestor of the subsequent received memory request. After the prefetched data is read-out from its slot, the process flow continues to node 790, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for generating memory prefetches in caching systems, comprising:
  receiving an initial memory read request from one of a plurality of requestors, each requestor having a corresponding request width;
  generating a prefetch addresses corresponding to the initial received memory read request, an address associated with the initial received memory read request, and the request width of the requestor of the initial received memory read request;
  generating prefetch operations using the generated prefetch addresses, wherein each generated prefetch address is stored in a prefetch buffer slot that is selected by a prefetch FIFO (First In First Out) prefetch counter, wherein each slot includes an address buffer for storing one of the generated prefetch addresses and includes a data buffer for storing data that is prefetched in response to the prefetch address stored in the address buffer of the slot, wherein a size of the data buffer is selected in response to the request width of the initial received memory read request; and
  returning prefetched data to the requestor in response to a subsequent memory read request received after the initial received memory read request from the same requestor.

2. The method of claim 1, wherein:
said plurality of requestors includes a level one data cache, a level one program cache and a level two unified cache, wherein the level one data cache has a request width of 64 bytes, the level one program cache has a request width of 32 bytes and the level two unified cache has a request width of 128 bytes
said step of generating a prefetch address generates a prefetch address differing from the address associated with the initial received memory read request by 32 bytes if the requestor is the level one program cache, differing by 64 bytes if the requestor is the level one data cache and differing by 128 bytes if the requestor is the level two unified cache.

3. The method of claim 1, further comprising:
storing a direction bit having an increasing state or a decreasing state; and
wherein said step of generating a prefetch address generates an address greater than the address associated with the initial received memory read request if the direction bit has the increasing state and generates an address less than the address associated with the initial received memory read request if the direction bit has the decreasing state.

4. A digital system, comprising:
a memory system including a hierarchical cache system for storing and retrieving data, said hierarchical cache system including a level one program cache, a level one data cache and a level two unified cache;
a prefetch unit including
  a prefetch address generator that is arranged to generate prefetch addresses in response to addresses associated with memory read requests received from said hierarchical cache system, the prefetch address differing from an address associated with an initial received memory read request by a first predetermined amount if the requestor is said level one program cache, differing by a second predetermined amount which is greater than said first predetermined amount if the requestor is said level one data cache and differing by a third predetermined amount which is greater than said second predetermined amount if the requestor is said level two unified cache, and
  a prefetch buffer that is arranged to store the prefetch addresses in slots of the prefetch buffer, wherein each slot includes a buffer for storing a prefetch address, a data buffer for storing data that is prefetched using the prefetch address stored in the same slot, and a wherein a size of the data buffer is selected based upon whether the requestor supplying an initial received memory read request which triggered the prefetch was said level one program cache, said level one data cache or said level two unified cache.

5. A multi-stream prefetch unit for generating memory prefetches in caching systems, comprising:
- a memory interface that is arranged to receive memory read requests each having an associated address from a level one program cache, a level one data cache and a level two unified cache, wherein the associated address points to data stored in a lower-level hierarchical memory;
- a data prefetch unit that is arranged to generate prefetch addresses in response to addresses associated with memory read requests, said prefetch address differing from an address associated with an initial received memory read request by a first predetermined amount if the requestor is said level one program cache, and that is arranged to store the prefetch addresses in slots of the data prefetch buffer, wherein each slot includes a buffer for storing a prefetch address and a variable-size buffer for storing data that is prefetched using the prefetch address stored in the same slot;
- a program prefetch unit that is arranged to generate prefetch addresses in response to addresses associated with memory read requests, said prefetch address differing from an address associated with an initial received memory read request by a second predetermined amount which is greater than said first predetermined amount if the requestor is said level one data cache and differing by a third predetermined amount which is greater than said second predetermined amount if the requestor is said level two unified cache, and that is arranged to store the prefetch addresses in slots of the program prefetch buffer, wherein each slot includes a buffer for storing a prefetch address and a variable-size buffer for storing data that is prefetched using the prefetch address stored in the same slot; and
- a prefetch unit selector that is arranged to select the program prefetch unit in response to a determination that said memory read request is from said level one program cache, that is arranged to select the data prefetch unit in response to a determination that said memory read request is from said level one data cache or from said level two unified cache, and to send the received memory read request to the selected one of the program prefetch unit or the data prefetch unit.

* * * * *